United States Patent [19]
Mizuno et al.

[11] Patent Number: 4,824,070
[45] Date of Patent: Apr. 25, 1989

[54] MOLD ASSEMBLY FOR PRODUCING SKIN-COVERED FOAMED PLASTIC ARTICLE

[75] Inventors: Hisayoshi Mizuno; Masami Mori, both of Kanagawa, Japan

[73] Assignee: Ikeda Bussan Co., Ltd., Ayase, Japan

[21] Appl. No.: 212,792

[22] Filed: Jun. 29, 1988

[30] Foreign Application Priority Data

Sep. 30, 1987 [JP] Japan .................... 62-149758

[51] Int. Cl.$^4$ ............................................ B29C 33/14
[52] U.S. Cl. .................................... 249/93; 249/95; 249/112; 249/205; 264/46.4; 264/257; 264/275; 425/117; 425/DIG. 48
[58] Field of Search ............... 249/83, 91, 93, 95, 249/112, 160, 170, 171, 205, 219.1; 425/112, 117, 127, 129.1, 397, 400, 403.1, 817 R, DIG. 48; 264/46.4, 46.6, 46.8, 257, 275, 267, 316

[56] References Cited

U.S. PATENT DOCUMENTS 4,046,611  9/1977  Sanson ............................ 264/46.8
4,545,105 10/1985  Kowalsky ................... 425/DIG. 48

FOREIGN PATENT DOCUMENTS 2237668  6/1973  Fed. Rep. of Germany ..... 264/46.8
3704528  2/1988  Fed. Rep. of Germany ..... 264/46.8

Primary Examiner—Jay H. Woo
Assistant Examiner—James C. Housel
Attorney, Agent, or Firm—Foley & Lardner, Schwartz, Jeffery, Schwaab, Mack, Blumenthal & Evans

[57] ABSTRACT

A mold assembly for producing a skin-covered foamed plastic article is disclosed, which includes a lower mold having a cavity formed therein, the lower mold having a first flange portion which extends around a mouth of the lower mold; an upper mold which is to be put on the lower mold to close the cavity, the upper mold having a second flange portion which is mated with the first flange portion of the lower mold when the two molds are properly coupled; a recess at an inside part of the first flange portion which is defined by a horizontal wall and a vertical wall; a press plate which is pivotally connected to the horizontal wall of the recess; a spring for biasing the press plate in a direction to achieve an abutment with the horizontal wall; and a press structure provided on the second flange portion of the upper mold, the press structure abutting on the press plate to press the same toward the horizontal wall when the upper mold is properly mounted on the lower mold.

8 Claims, 1 Drawing Sheet

MOLD ASSEMBLY FOR PRODUCING SKIN-COVERED FOAMED PLASTIC ARTICLE

BACKGROUND OF THE INVENTION

1. Field of the Invention

The present invention relates in general to a mold assembly for producing a foamed plastic article, and more particularly to a mold assembly for producing a skin-covered foamed plastic article, such as a skin-covered urethane foam pad for a seat cushion and/or a seatback of a seat.

2. Description of the Prior Art

Hitherto, in the field of manufacturing the skin-covered foamed plastic articles, a method has been widely employed which generally comprises by steps placing a bag-shaped outer skin member in a mold, pouring a liquid material of foamed plastic into the outer skin member in the mold, curing the material and removing a product, viz., a skin-covered foamed plastic article, from the mold upon the product being hardened to a sufficient level. However, it has been difficult or at least troublesome to properly and stably set the outer skin member in a right position of the mold. In fact, during curing of the material of the foamed plastic, the outerskin member is applied with a notable pressure due to vigorous foaming of the material, so that it tends to occur that the outer skin member is displaced from the right position. This causes deterioration in quality of the products.

One of the methods hitherto employed for eliminating the above-mentioned drawback is to use a double-sided adhesive tape for assuring the stable positioning of the outer skin member relative to the mold during the curing of the material. That is, the outer skin member is attached to the cavity wall of the mold with an interposal of the double-sided adhesive tape therebetween.

However, using the adhesive tape has caused the products to be soiled considerably due to the adhesive remained thereon. In addition, due to the nature of the adhesive tape, the outer skin member is enforced to produce unsightly creases thereon. Furthermore, it has occured that the products are somewhat damaged when the tape is peeled or removed from the products.

SUMMARY OF THE INVENTION

It is therefore an object of the present invention to provide a mold assembly for producing a skin-covered foamed plastic article, which is free of the above-mentioned drawback.

According to the present invention, there is provided a mold assembly for producing a skin-covered foamed plastic article. The mold assembly comprises a lower mold having a cavity formed therein, the lower mold having a first flange portion which extends around a mouth of the lower mold; an upper mold which is to be put on the lower mold to close the cavity, the upper mold having a second flange portion which is mated with the first flange portion of the lower mold when the two molds are properly coupled; means defining at an inboard side of the first flange portion a recess which is defined by a horizontal wall and a vertical wall; a press plate which is pivotally connected to the horizontal wall of the recess; biasing means for biasing the press plate in a direction to achieve an abutment with the horizontal wall; and a press structure provided on the second flange portion of the upper mold, the press structure abutting on the press plate to press the same toward the horizontal wall when the upper mold is properly mounted on the lower mold.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the drawings.

Figure 1:
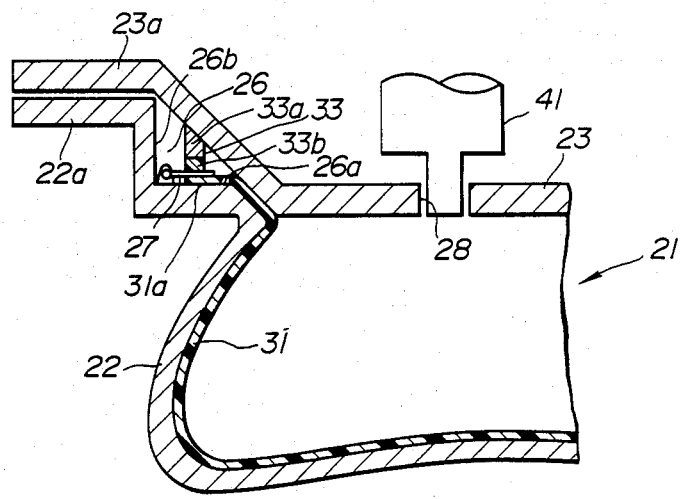
FIG. 1 is a partial sectional view of a mold assembly according to the present invention, with a bag-shaped outer skin member properly set in the mold assembly.
Figure 2:
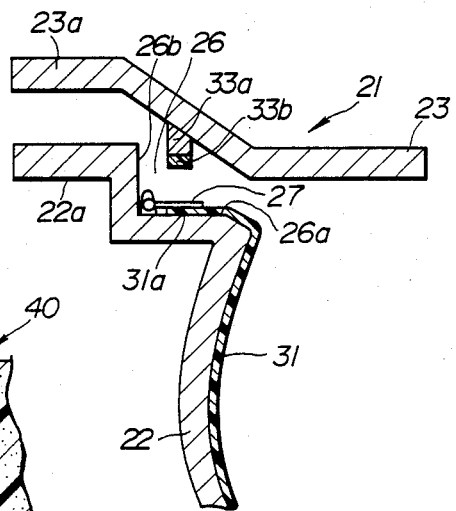
FIG. 2 is a partial sectional view of the mold assembly of the invention in a condition wherein an upper mold is lifted from a lower mold.

Referring to FIGS. 1 and 2, there is shown a mold assembly 21 according to the present invention.

The mold assembly 21 comprises a lower mold 22 and an upper mold 23 which is to be put on the lower mold 22. The lower mold 22 has a cavity formed therein. The upper mold 23 is shaped like a lid and has an opening 28 formed therethrough. As is seen from the drawings, the lower and upper molds 22 and 23 are formed with respective flange portions 22a and 23a which are mated when the two molds 22 and 23 are properly coupled.

The flange portion 22a of the lower mold 22 is formed at laterally opposed portions thereof with respective recesses 26 (only one is shown) each extending along a longitudinal axis of the lower mold 22. The recess 26 is defined by a longitudinally extending horizontal wall 26a and a longitudinally extending vertical wall 26b, as shown.

An elongate press plate 27 is pivotally connected to the horizontal wall 26a of each recess 26 through a known hinge means. Although not shown in the drawings, a spring is incorporated with the hinge means to bias the press plate 27 in a clockwise direction in FIG. 1, that is, in a direction to achieve an abutment with the horizontal wall 26a for the purpose which will be clarified hereinafter.

Press structures 33 are respectively mounted to laterally opposed portions of the flange portion 23a of the upper mold 23. Each press structure 33 is so positioned as to face the press plate 27 when the upper mold 23 is properly mounted on the lower mold 22. The press structure 33 comprises a base member 33a secured to the flange portion 23a and an elastically deformable member 33b, such as soft rubber, sponge rubber, foamed plastic or the like, bonded to the base member 33a. It is to be noted that the press structure 33 is so sized and constructed that when the upper mold 23 is properly mounted on the lower mold 22, the elastic member 33b abuts on the press plate 27 to press the same against the horizontal wall 26a.

In the following, the steps for producing the skin-covered foamed plastic article 40 (see FIG. 3) will be described.

First, a bag-shaped outer skin member 31 is prepared. The skin member 31 is shaped to match with the shape of the cavity of the lower mold 22 and comprises an outer skin layer and a wadding lined on a back surface of the outer skin layer.

The bag-shaped outer skin member 31 is put into the cavity of the lower mold 22 having its upper peripheral portion 31a placed on the press plates 27. Then, by lifting the press plates 27, the upper peripheral portion 31a of the skin member 31 is put between each press plate 27 and the corresponding horizontal wall 26a of the flange portion 22a. Under this condition, due to the biasing force applied to the press plates 27 by the springs (not shown), the peripheral upper portion 31a of the outer skin member 31 is stationary held by the press plates 27.

Then, the upper mold 23 is put on the lower mold 22 to close the cavity of the lower mold 22. Under this condition, both the press structures 33 of the upper mold 23 press the corresponding press plates 27 toward the horizontal walls 26a thereby assuring or promoting the holding function of the press plates 27 relative to the outer skin member 31. That is, the outer skin member 31 is stably held in the cavity of the lower mold 22.

Then, a liquid material for foamed plastic, such as a material for polyurethane foam or the like, is poured into the bag-shaped outer skin member 31 in the mold 22. For this pouring, a nozzle 41 of a plastic material pouring machine is projected into the mold cavity through the opening 28.

Figure 3:
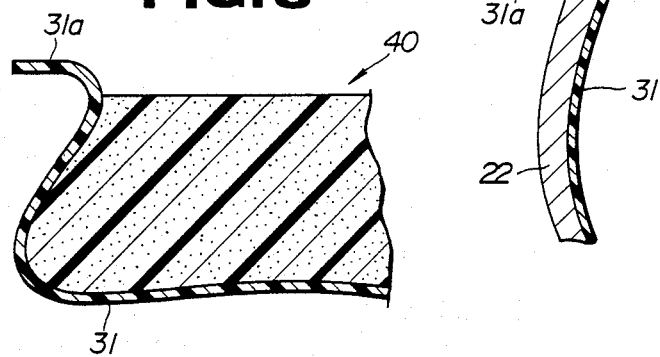
FIG. 3 is a partial sectional view of a product, viz., a skin-covered foamed plastic article, which is produced via the mold assembly of the present invention.

After the material is hardened to a sufficient level, the upper mold 23 is dismantled from the lower mold 22, and then, by lifting the press plates 27, a product 40, viz., a skin-covered foamed plastic article 40, is removed from the lower mold 22. With these steps, the skin-covered foamed plastic article 40 as shown in FIG. 3 is produced.

In the following, modifications of the present invention will be described.

If desired, a plurality of small-sized press plates 27 may be used in place of the above-mentioned single elongate press plate 27 on each horizontal wall 26a.

A coil spring may be used in place of the elastic member 33b of the press structure 33.

What is claimed is:

1. A mold assembly for producing a skin-covered foamed plastic article, comprising:
   a lower mold having a cavity formed therein, said lower mold having a first flange portion which extends around a mouth of said lower mold;
   an upper mold which is to be put on said lower mold to close said cavity, said upper mold having a second flange portion which is mated with said first flange portion of said lower mold when the two molds are properly coupled;
   means defining at an inboard side of said first flange portion a recess which is defined by a horizontal wall and a vertical wall;
   a press plate which is pivotally connected to said horizontal wall of said recess;
   biasing means for biasing said press plate in a direction to achieve an abutment with said horizontal wall; and
   a press structure provided on and extending from said second flange portion of the upper mold, said press structure abutting on the press plate to press the same toward the horizontal wall when said upper mold is properly mounted on the lower mold.

2. A mold assembly for producing a skin-covered foamed plastic article, comprising:
   a lower mold having a cavity formed therein, said lower mold having a first flange portion which extends around a mouth of said lower mold;
   an upper mold which is to be put on said lower mold to close said cavity, said upper mold having a second flange portion which is mated with said first flange portion of said lower mold when the two molds are properly coupled;
   means defining at laterally opposed portions of said first flange portion respective recesses each being defined by a horizontal wall and a vertical wall;
   a pair of press plates which are pivotally connected to the respective horizontal walls of said recesses;
   biasing means for biasing each of said press plates in a direction to achieve an abutment with the corresponding horizontal wall; and
   a pair of press structures respectively provided on and extending from laterally opposed portions of said second flange portion of the upper mold, each press structure abutting on one of the press plates to press the same toward the corresponding horizontal wall when said upper mold is properly mounted on the lower mold.

3. A mold assembly as claimed in claim 2, in which each of said press structures has a leading end and an elastically deformable member fixed thereto.

4. A mold assembly as claimed in claim 3, in which said elastically deformable member is selected from a group which consists of a soft rubber, a sponge rubber, a foamed plastic and a coil spring.

5. A mold assembly as claimed in claim 4, in which each of said press structures further comprises a base member which has one end secured to said second flange portion and the other leading end to which said elastically deformable member is bonded.

6. A mold assembly as claimed in claim 5, in which each of said press plates is connected to the corresponding horizontal wall of the recess through hinge means.

7. A mold assembly as claimed in claim 6, in which said biasing means is a spring which is incorporated with said hinge means.

8. A mold assembly as claimed in claim 7, in which said upper mold is formed with an opening through which a nozzle of a plastic material pouring machine is projected into the cavity of the lower mold.

* * * * *